(12) United States Patent
Heim et al.

(10) Patent No.: US 12,054,145 B2
(45) Date of Patent: Aug. 6, 2024

(54) LANE CONNECTORS AS A CONSTRAINT

(71) Applicant: Motional AD LLC, Boston, MA (US)

(72) Inventors: Marc Dominik Heim, Singapore (SG); Titus Chua, Singapore (SG)

(73) Assignee: Motional AD LLC, Boston, MA (US)

(*) Notice: Subject to any disclaimer, the term of this patent is extended or adjusted under 35 U.S.C. 154(b) by 267 days.

(21) Appl. No.: 17/118,459

(22) Filed: Dec. 10, 2020

(65) Prior Publication Data
US 2022/0185272 A1 Jun. 16, 2022

(51) Int. Cl.
B60W 30/12 (2020.01)
B60W 30/18 (2012.01)
G08G 1/16 (2006.01)

(52) U.S. Cl.
CPC ...... B60W 30/12 (2013.01); B60W 30/18154 (2013.01); G08G 1/167 (2013.01); B60W 2552/30 (2020.02); B60W 2556/40 (2020.02)

(58) Field of Classification Search
CPC ........... B60W 30/12; B60W 30/18154; B60W 2552/30; B60W 2556/40; B60W 60/001; B60W 2552/53; B60W 30/10; B60W 30/18159; B60W 40/06; B60W 2556/45; B60W 2050/0026; G08G 1/167; G08G 1/166; G01S 13/865; G01S 13/867; G01S 17/931; G01S 13/931; G01C 21/34;
(Continued)

(56) References Cited

U.S. PATENT DOCUMENTS 11,480,962 B1 * 10/2022 Dax .................. G05D 1/0088
2008/0162027 A1 * 7/2008 Murphy .............. G05D 1/0274
701/1
(Continued)

FOREIGN PATENT DOCUMENTS

JP 2004-245610 9/2004
JP 2008-128745 6/2008
(Continued)

OTHER PUBLICATIONS

"Surface Vehicle Recommended Practice: Taxonomy and Definitions for Terms Related to Driving Automation Systems for On-Road Moto Vehicles," SAE International, Sep. 30, 2016, 30 pages.
(Continued)

Primary Examiner — Jason Holloway
(74) Attorney, Agent, or Firm — Fish & Richardson P.C.

(57) ABSTRACT

Among other things, systems and techniques are described for planning and control of a vehicle. A described technique includes obtaining a lateral width lookup table associated with a map of a geographic region, the map including information identifying lanes and lane connectors on which a vehicle can travel in the geographic region, the lookup table including lateral widths associated with the lanes and the lane connectors; determining a list of at least one lane or lane connector in at least one path of the vehicle; querying the lookup table to obtain at least one lateral width corresponding to the at least one lane or lane connector; generating spatial constraints for the at least one lane or lane connector based on the at least one lateral width; generating trajectories based on the list and the spatial constraints; and causing the vehicle to move along a selected trajectory of the trajectories.

20 Claims, 16 Drawing Sheets

(58) Field of Classification Search
CPC ............. G01C 21/3822; G05D 1/0212; G05D 2201/0213; B60Y 2300/10
See application file for complete search history.

(56) References Cited

U.S. PATENT DOCUMENTS

| | | | |
|---|---|---|---|
| 2009/0299626 A1* | 12/2009 | Denaro | G01C 21/3697 707/999.102 |
| 2010/0161192 A1 | 6/2010 | Nara et al. | |
| 2011/0160919 A1* | 6/2011 | Orr | A01M 7/0089 340/584 |
| 2014/0207325 A1 | 7/2014 | Mudalige et al. | |
| 2014/0257686 A1* | 9/2014 | Feldman | B60W 30/12 701/300 |
| 2015/0345966 A1 | 12/2015 | Meuleau et al. | |
| 2016/0102987 A1* | 4/2016 | Ding | G01C 21/32 701/532 |
| 2017/0277193 A1 | 9/2017 | Frazzoli et al. | |
| 2018/0111612 A1* | 4/2018 | Jiang | G05D 1/0238 |
| 2018/0088576 A1 | 5/2018 | Kong et al. | |
| 2018/0150081 A1 | 5/2018 | Gross et al. | |
| 2018/0259957 A1 | 9/2018 | Charrow et al. | |
| 2018/0281785 A1 | 10/2018 | Berntorp et al. | |
| 2018/0345991 A1 | 12/2018 | Mimura et al. | |
| 2018/0357904 A1* | 12/2018 | Miyata | B60W 30/18163 |
| 2019/0079514 A1 | 3/2019 | Zhu | |
| 2019/0107842 A1 | 4/2019 | Miura et al. | |
| 2020/0182633 A1 | 6/2020 | Liu et al. | |
| 2020/0211375 A1* | 7/2020 | Vig | G08G 1/09623 |
| 2021/0033412 A1 | 2/2021 | Mielenz | |
| 2021/0201145 A1* | 7/2021 | Pham | G06N 3/08 |

FOREIGN PATENT DOCUMENTS

| | | |
|---|---|---|
| JP | 2019-067345 | 4/2019 |
| KR | 10-2019-0042205 | 4/2019 |

OTHER PUBLICATIONS

Althoff et al., "Closed-loop safety assessment of uncertain roadmaps," Autonomous Robots, Jul. 17, 2015, 40:67-289.
Dærik [online], "My Experience with Tesla's Navigate On Autopilot," Presented by Daerik on Nov. 5, 2018, retrieved on Feb. 11, 2020, Retrieved from <https://youtu.be/iCNUFE9hJRk?t=168 >, 1 pages [Video Submission].

* cited by examiner

LANE CONNECTORS AS A CONSTRAINT

FIELD OF THE INVENTION

This description relates to planning and control.

BACKGROUND

A road that connects one location (e.g., an origin) and another location (e.g., a destination) in a geographic region can include one or more turns. The road can also include multiple lanes. An autonomous vehicle driving on the road may need to change lanes, for example, when turning. Lane changes can be abrupt, e.g., can involve a short transverse movement over a short longitudinal distance, or can be gradual, e.g., can involve a long transverse movement over a long longitudinal distance.

DETAILED DESCRIPTION

Figure 1:
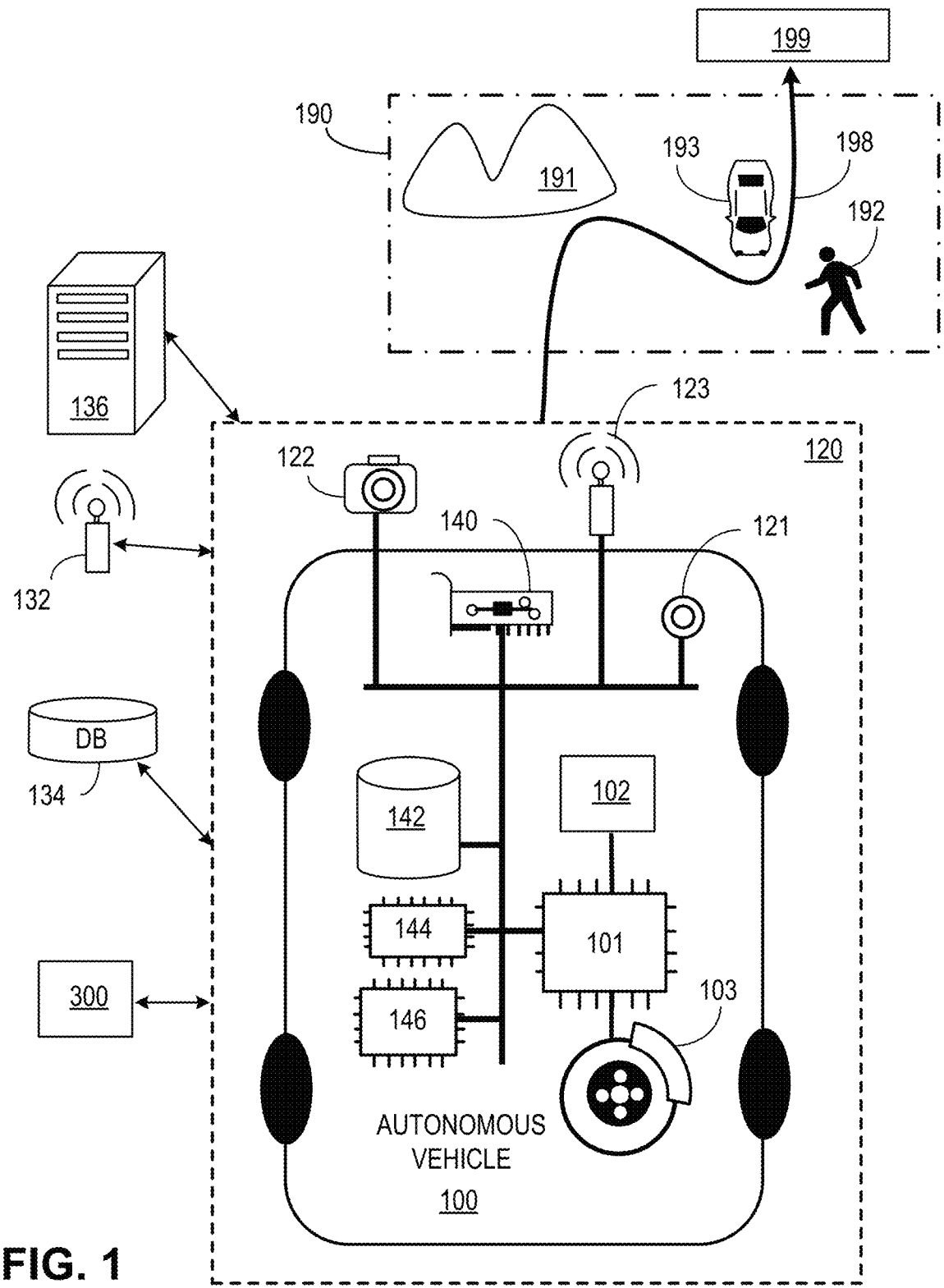
FIG. 1 shows an example of an autonomous vehicle (AV) having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. Lateral Width Lookup Table for AV Planning & Control General Overview This disclosure provides, among other things, techniques and systems which use a specialized lookup table(s) that provides lateral widths for lanes and lane connectors. Spatial constraints can be determined based on these lateral widths. Spatial constraints for lanes and connectors can be used so that the AV has information on how much lateral distance the AV has to work with in its planning decisions. To create these constraints, the vehicle's planning circuit queries the lookup table to determine how far a lane or lane connector is from a transition in a vehicle path. Vehicle trajectories are determined based on the spatial constraints. A larger lateral width for a lane or lane connector provides more possible trajectories for a vehicle to move within a lane or a lane connector.

The techniques and systems can provide greater flexibility in terms of planning and controlling the movement of a vehicle. For example, the techniques and systems can provide greater flexibility for lateral constraints associated with lanes and connectors that are used to determine one or more potential paths for a vehicle to follow. The techniques and systems can enable more precise determinations of the lateral distance that is available to the vehicle for maneuvering. The techniques and systems can enable more options to handle pedestrians, potholes, and other obstacles. For example, if a pedestrian on the road ahead of the vehicle is or about to violate a minimum safe passing distance, rather than stopping or violating the minimum safe passing distance, the vehicle can use the greater flexibility to safely maneuver away from the pedestrian while continuing on to the vehicle's destination.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
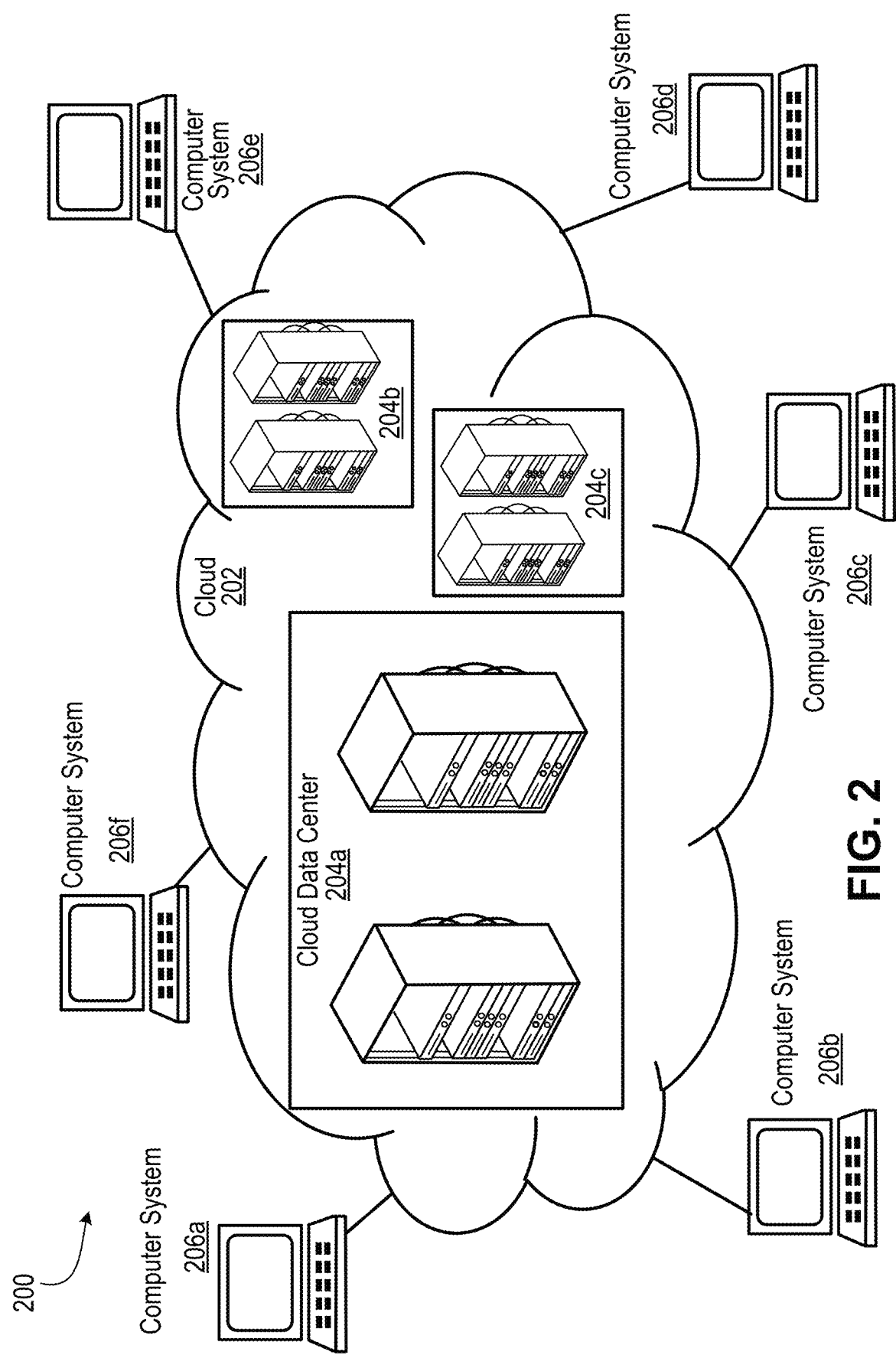
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
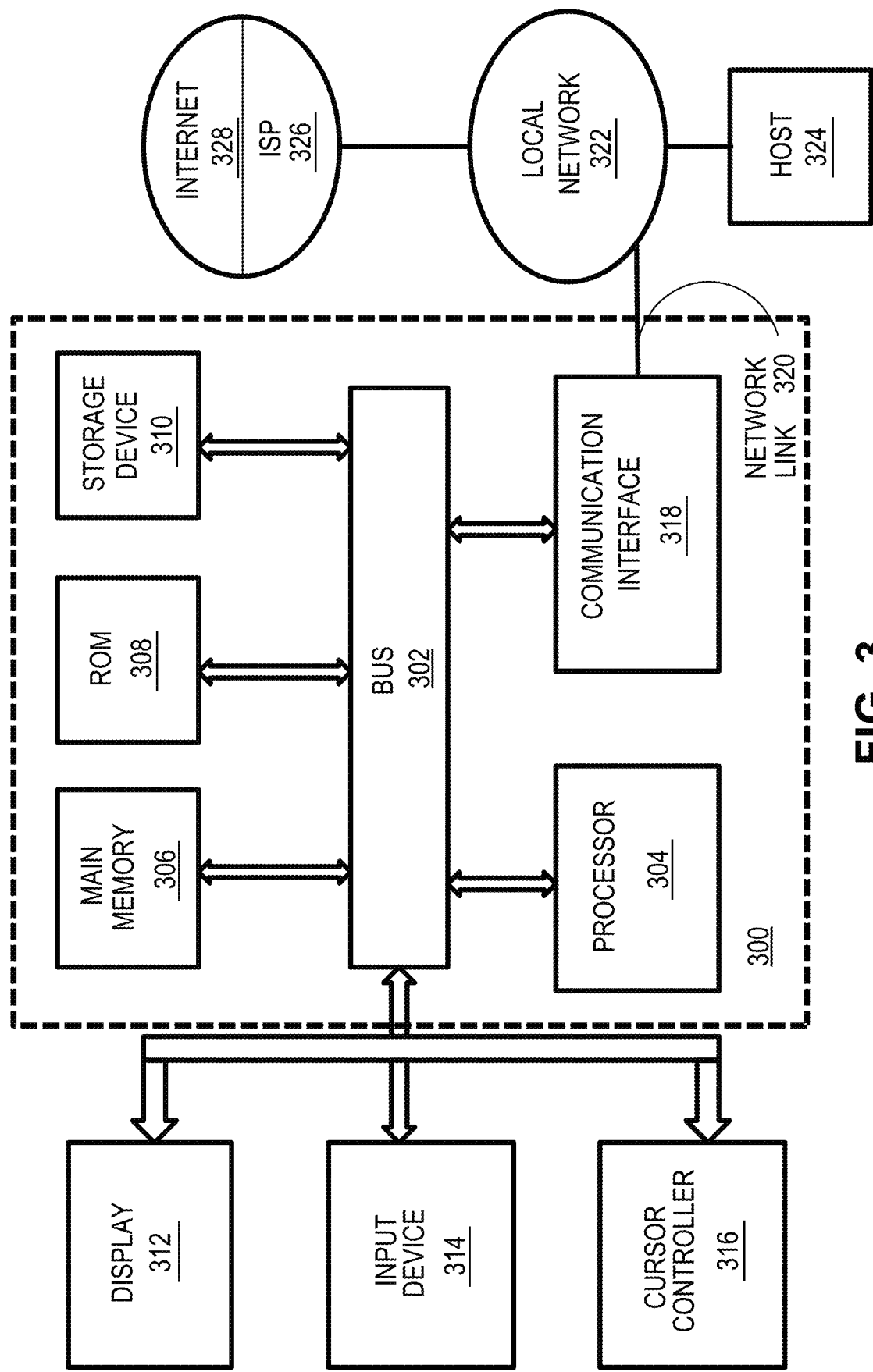
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
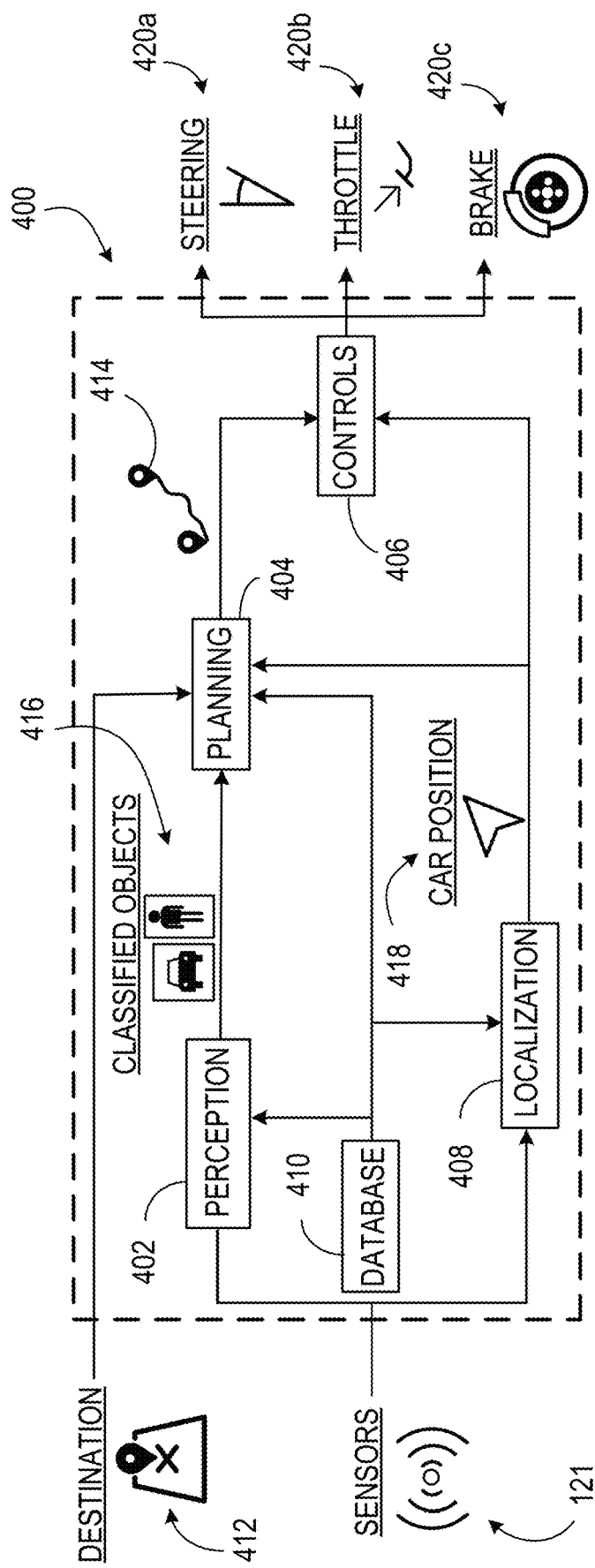
FIG. 4 shows an example architecture for an AV.

FIG. 4 shows an example architecture 400 for an AV (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
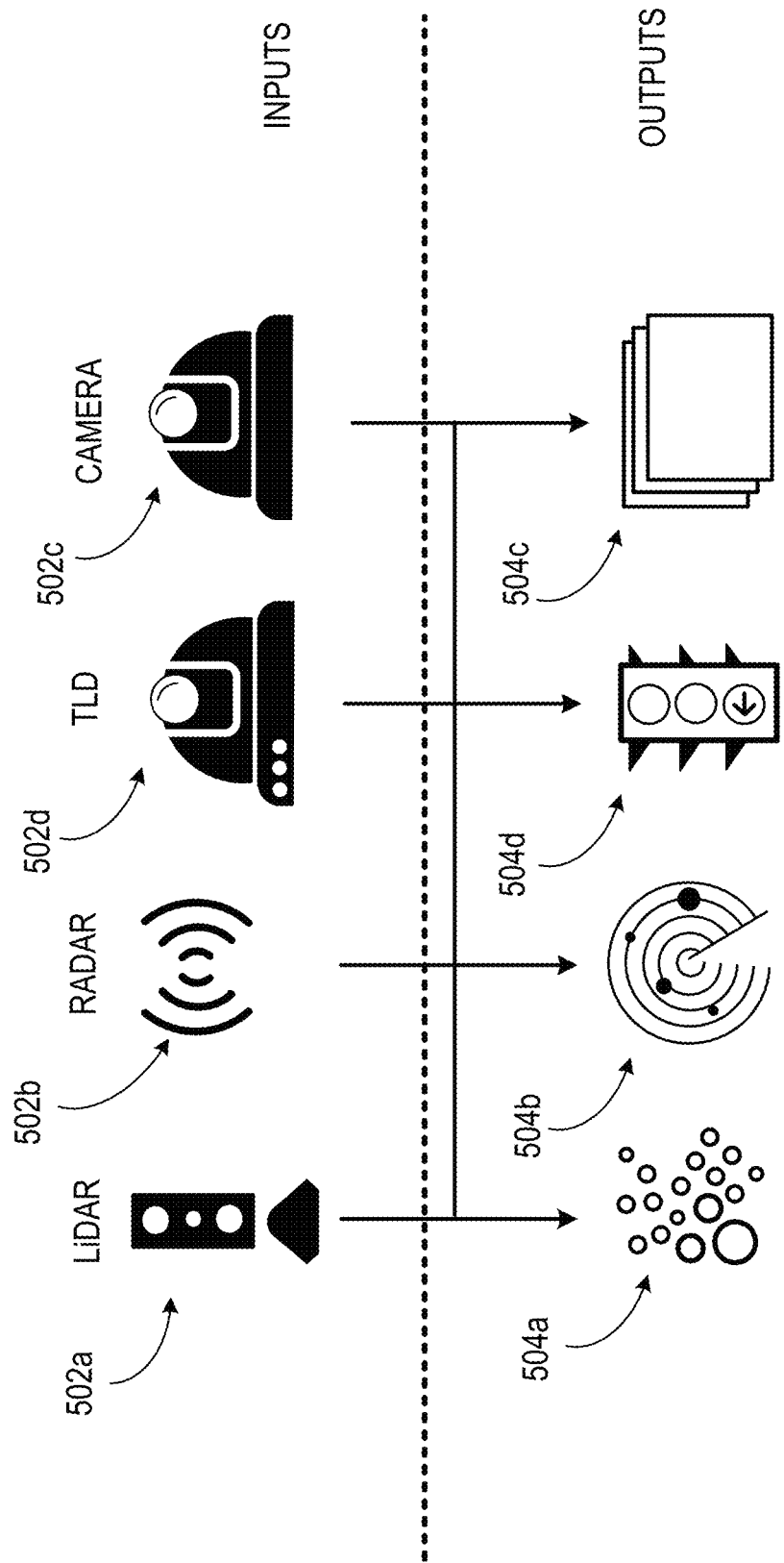
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Path Planning

Figure 6:
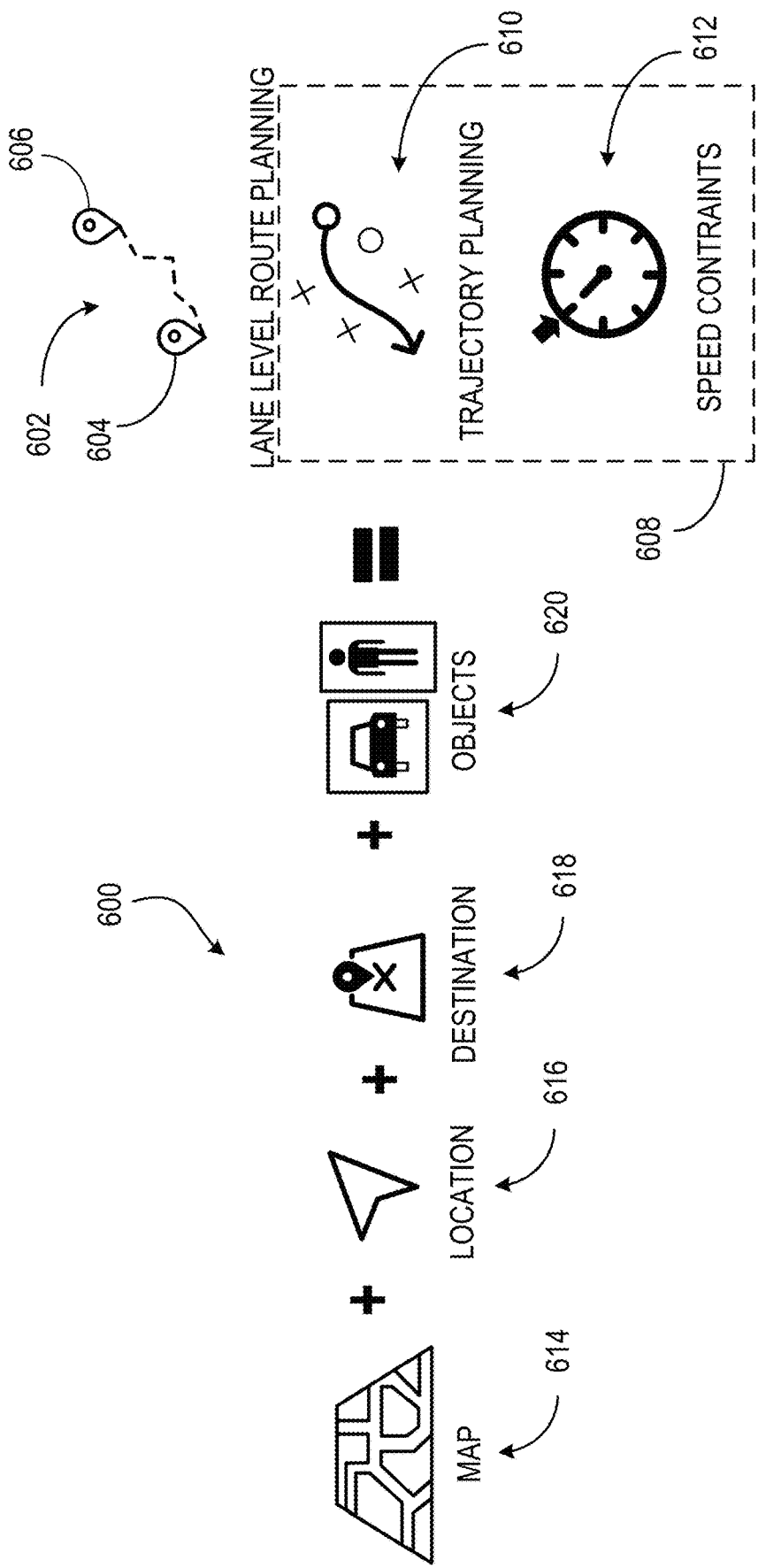
FIG. 6 shows a block diagram of the relationships between inputs and outputs of a planning module.

FIG. 6 shows a block diagram 600 of the relationships between inputs and outputs of a planning module 404 (e.g., as shown in FIG. 4). In general, the output of a planning module 404 is a route 602 from a start point 604 (e.g., source location or initial location), and an end point 606 (e.g., destination or final location). The route 602 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 602 includes "off-road" segments such as unpaved paths or open fields.

In addition to the route 602, a planning module also outputs lane-level route planning data 608. The lane-level route planning data 608 is used to traverse segments of the route 602 based on conditions of the segment at a particular time. For example, if the route 602 includes a multi-lane highway, the lane-level route planning data 608 includes trajectory planning data 610 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 608 includes speed constraints 612 specific to a segment of the route 602. For example, if the segment includes pedestrians or unexpected traffic, the speed constraints 612 may limit the vehicle 100 to a travel speed slower than an expected speed, e.g., a speed based on speed limit data for the segment.

In an embodiment, the inputs to the planning module 404 includes database data 614 (e.g., from the database module 410 shown in FIG. 4), current location data 616 (e.g., the AV position 418 shown in FIG. 4), destination data 618 (e.g., for the destination 412 shown in FIG. 4), and object data 620 (e.g., the classified objects 416 as perceived by the perception module 402 as shown in FIG. 4). In some embodiments, the database data 614 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 7:
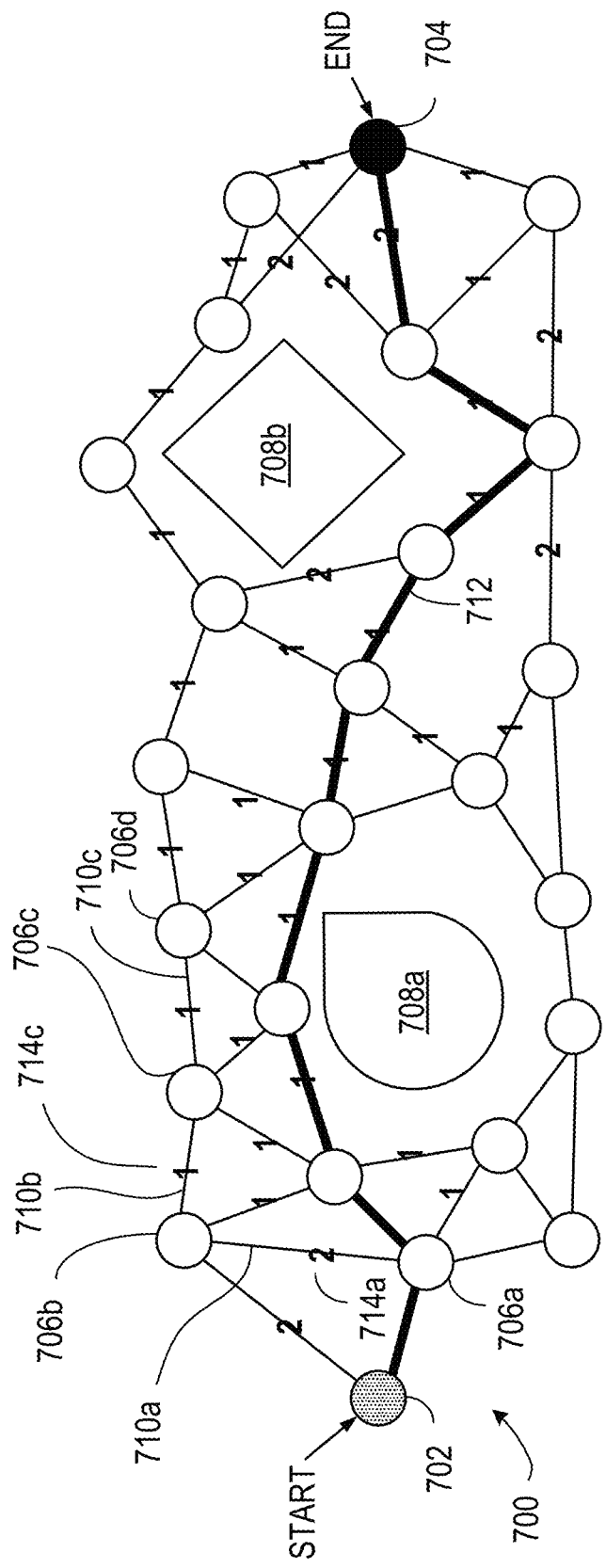
FIG. 7 shows a directed graph used in path planning.

FIG. 7 shows a directed graph 700 used in path planning, e.g., by the planning module 404 (FIG. 4). In general, a directed graph 700 like the one shown in FIG. 7 is used to determine a path between any start point 702 and end point 704. In real-world terms, the distance separating the start point 702 and end point 704 may be relatively large (e.g., in two different metropolitan areas) or may be relatively small (e.g., two intersections abutting a city block or two lanes of a multi-lane road).

In an embodiment, the directed graph 700 has nodes 706a-d representing different locations between the start point 702 and the end point 704 that could be occupied by an vehicle 100. In some examples, e.g., when the start point 702 and end point 704 represent different metropolitan areas, the nodes 706a-d represent segments of roads. In some examples, e.g., when the start point 702 and the end point 704 represent different locations on the same road, the nodes 706a-d represent different positions on that road. In this way, the directed graph 700 includes information at varying levels of granularity. In an embodiment, a directed graph having high granularity is also a subgraph of another directed graph having a larger scale. For example, a directed graph in which the start point 702 and the end point 704 are far away (e.g., many miles apart) has most of its information at a low granularity and is based on stored data, but also includes some high granularity information for the portion of the graph that represents physical locations in the field of view of the vehicle 100.

The nodes 706a-d are distinct from objects 708a-b which cannot overlap with a node. In an embodiment, when granularity is low, the objects 708a-b represent regions that cannot be traversed by automobile, e.g., areas that have no streets or roads. When granularity is high, the objects 708a-b represent physical objects in the field of view of the vehicle 100, e.g., other automobiles, pedestrians, or other entities with which the vehicle 100 cannot share physical space. In an embodiment, some or all of the objects 708a-b are a static objects (e.g., an object that does not change position such as a street lamp or utility pole) or dynamic objects (e.g., an object that is capable of changing position such as a pedestrian or other car).

The nodes 706a-d are connected by edges 710a-c. If two nodes 706a-b are connected by an edge 710a, it is possible for an vehicle 100 to travel between one node 706a and the other node 706b, e.g., without having to travel to an intermediate node before arriving at the other node 706b. (When we refer to an vehicle 100 traveling between nodes, we mean that the vehicle 100 travels between the two physical positions represented by the respective nodes.) The edges 710a-c are often bidirectional, in the sense that an vehicle 100 travels from a first node to a second node, or from the second node to the first node. In an embodiment, edges 710a-c are unidirectional, in the sense that an vehicle 100 can travel from a first node to a second node, however the vehicle 100 cannot travel from the second node to the first node. Edges 710a-c are unidirectional when they represent, for example, one-way streets, individual lanes of a street, road, or highway, or other features that can only be traversed in one direction due to legal or physical constraints.

In an embodiment, the planning module 404 uses the directed graph 700 to identify a path 712 made up of nodes and edges between the start point 702 and end point 704. An edge 710a-c has an associated cost 714a-b. The cost 714a-b is a value that represents the resources that will be expended if the vehicle 100 chooses that edge. A typical resource is time. For example, if one edge 710a represents a physical distance that is twice that as another edge 710b, then the associated cost 714a of the first edge 710a may be twice the associated cost 714b of the second edge 710b. Other factors that affect time include expected traffic, number of intersections, speed limit, etc. Another typical resource is fuel economy. Two edges 710a-b may represent the same physical distance, but one edge 710a may require more fuel than another edge 710b, e.g., because of road conditions, expected weather, etc. When the planning module 404 identifies a path 712 between the start point 702 and end point 704, the planning module 404 typically chooses a path optimized for cost, e.g., the path that has the least total cost when the individual costs of the edges are added together.

AV Control

Figure 8:
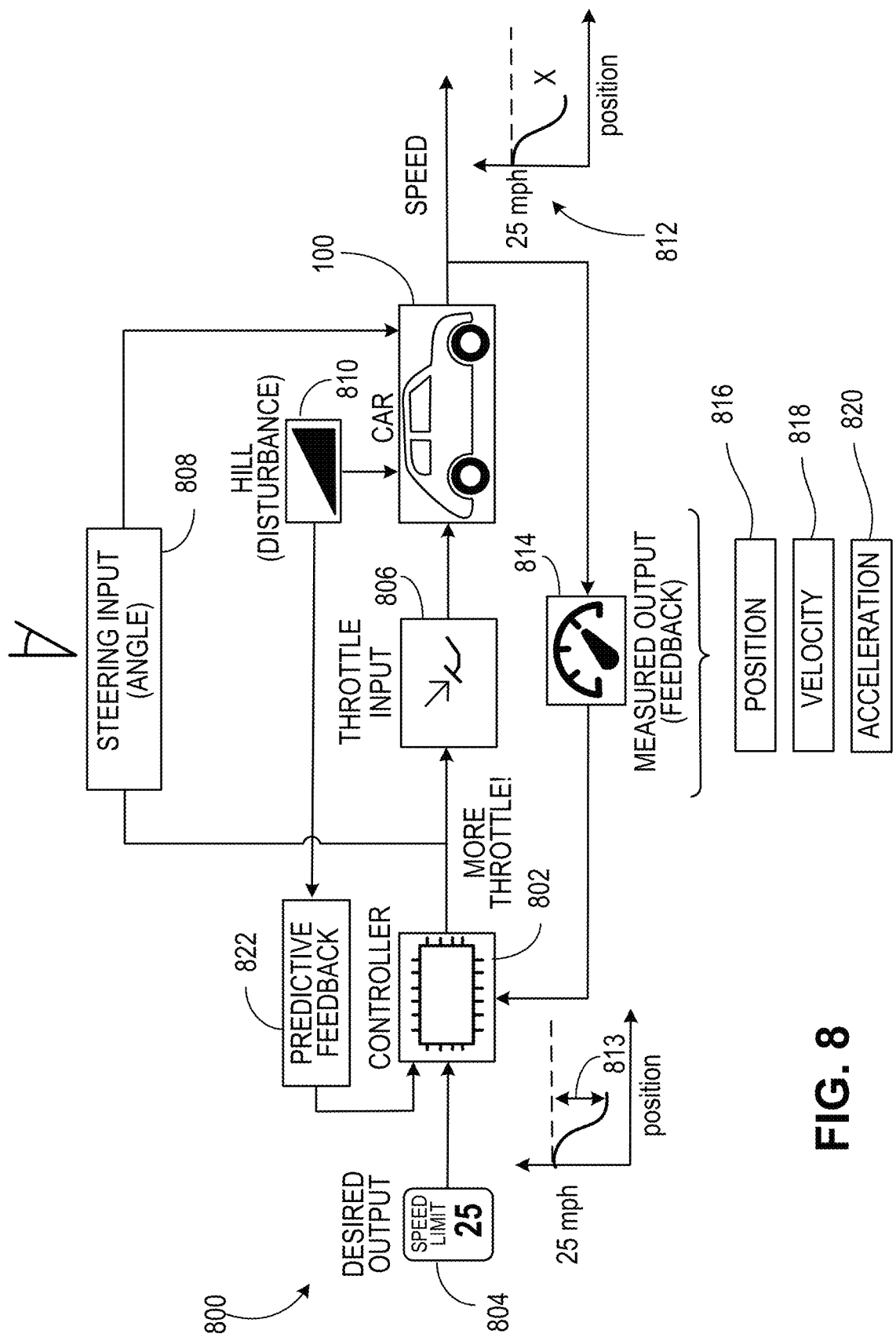
FIG. 8 shows a block diagram of the inputs and outputs of a control module.

FIG. 8 shows a block diagram 800 of the inputs and outputs of a control module 406 (e.g., as shown in FIG. 4). A control module operates in accordance with a controller 802 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 802 when the instructions are executed (e.g., by the one or more processors). In an embodiment, a control circuit includes the controller 802.

In an embodiment, the controller 802 receives data representing a desired output 804. The desired output 804 typically includes a velocity, e.g., a speed and a heading. The desired output 804 can be based on, for example, data received from a planning module 404 (e.g., as shown in FIG. 4). In accordance with the desired output 804, the controller 802 produces data usable as a throttle input 806 and a steering input 808. The throttle input 806 represents the magnitude in which to engage the throttle (e.g., acceleration control) of an vehicle 100, e.g., by engaging the steering pedal, or engaging another throttle control, to achieve the desired output 804. In some examples, the throttle input 806 also includes data usable to engage the brake (e.g., deceleration control) of the vehicle 100. The steering input 808 represents a steering angle, e.g., the angle at which the steering control (e.g., steering wheel, steering angle actuator, or other functionality for controlling steering angle) of the AV should be positioned to achieve the desired output 804.

In an embodiment, the controller 802 receives feedback that is used in adjusting the inputs provided to the throttle and steering. For example, if the vehicle 100 encounters a disturbance 810, such as a hill, the measured speed 812 of the vehicle 100 is lowered below the desired output speed. In an embodiment, any measured output 814 is provided to the controller 802 so that the necessary adjustments are performed, e.g., based on the differential 813 between the measured speed and desired output. The measured output 814 includes a measured position 816, a measured velocity 818 (including speed and heading), a measured acceleration 820, and other outputs measurable by sensors of the vehicle 100.

In an embodiment, information about the disturbance 810 is detected in advance, e.g., by a sensor such as a camera or LiDAR sensor, and provided to a predictive feedback module 822. The predictive feedback module 822 then provides information to the controller 802 that the controller 802 can use to adjust accordingly. For example, if the sensors of the vehicle 100 detect ("see") a hill, this information can be used by the controller 802 to prepare to engage the throttle at the appropriate time to avoid significant deceleration.

Figure 9:
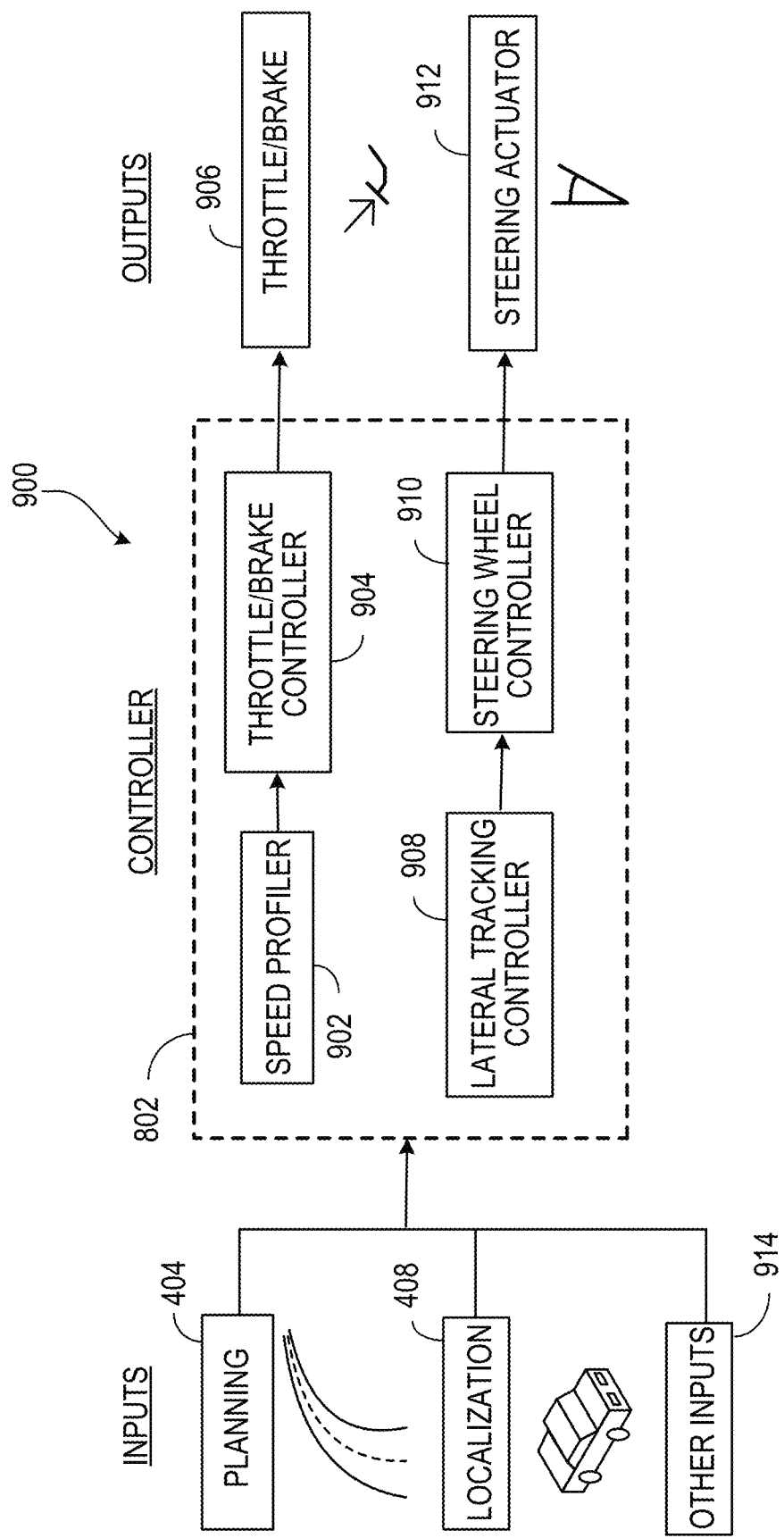
FIG. 9 shows a block diagram of the inputs, outputs, and components of a controller.

FIG. 9 shows a block diagram 900 of the inputs, outputs, and components of the controller 802. The controller 802 has a speed profiler 902 which affects the operation of a throttle/brake controller 904. For example, the speed profiler 902 instructs the throttle/brake controller 904 to engage acceleration or engage deceleration using the throttle/brake 906 depending on, e.g., feedback received by the controller 802 and processed by the speed profiler 902. The controller 802 includes a lateral tracking controller 908 which affects the operation of a steering controller 910. For example, the lateral tracking controller 908 instructs the steering controller 910 to adjust the position of the steering angle actuator 912 depending on, e.g., feedback received by the controller 802 and processed by the lateral tracking controller 908.

The controller 802 receives several inputs used to determine how to control the throttle/brake 906 and steering angle actuator 912. A planning module 404 provides information used by the controller 802, for example, to choose a heading when the vehicle 100 begins operation and to determine which road segment to traverse when the vehicle 100 reaches an intersection. A localization module 408 provides information to the controller 802 describing the current location of the vehicle 100, for example, so that the controller 802 can determine if the vehicle 100 is at a location expected based on the manner in which the throttle/brake 906 and steering angle actuator 912 are being controlled. In an embodiment, the controller 802 receives information from other inputs 914, e.g., information received from databases, computer networks, etc.

Lateral Width Lookup Table for AV Planning & Control

This section describes computer-implemented methods executed by the AV system, for example, by a planning circuit (see, e.g., 404 of FIG. 4), to plan lane-level routes on which the AV can travel. Planning a route can include determining one or more potential paths for the AV. The paths are physical, real-world paths in a geographic region. To plan the routes, the planning circuit represents and stores the geographic region as a map that includes map elements. The following paragraphs describe various map elements. Certain map elements have direct correspondence to physical, real world elements (e.g., lanes, intersections) while other map elements are conceptual and implemented as computer constructs generated and used by the planning circuit to plan routes. The map can include information identifying lanes and lane connectors on which a vehicle can travel in the geographic region. Information for lanes and lane connectors such as lateral widths can be stored in a lookup table. The planning circuit can access the lookup table to obtain lateral widths for route planning.

Figure 10A:
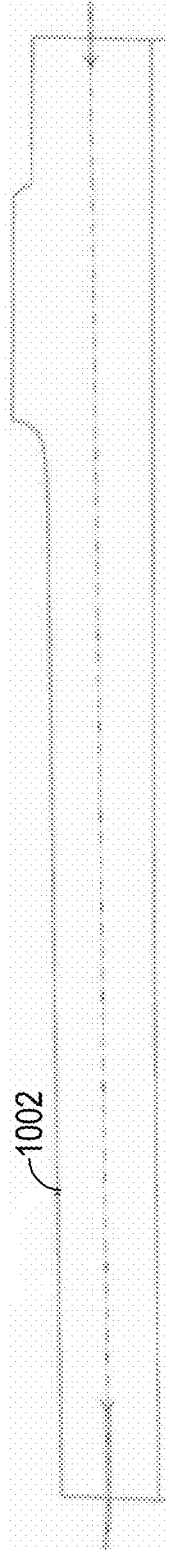
FIG. 10A shows a diagram of an example of a lane.

FIG. 10A shows a diagram of an example of a lane 1002. A lane 1002 is a physical lane on a road and is associated with a direction and a polygon representing its geographical extent on a geographic map. Two lanes can be connected via a lane connector. The lane 1002 can be associated with a road segment. Two adjacent lanes associated with the same direction can be separated by a lane divider (e.g., a lane marking). Lane dividers can have different types, for example, single solid white, single dashed white, double solid white, double dashed white, single zigzag white, and single solid yellow, left dashed white right solid white. In an embodiment, these lane divider types are assigned to the lane dividers during the process of constructing the maps as described above. A lane can be associated with a baseline sequence that provides, for example, a default path to take within the lane.

Figure 10B:
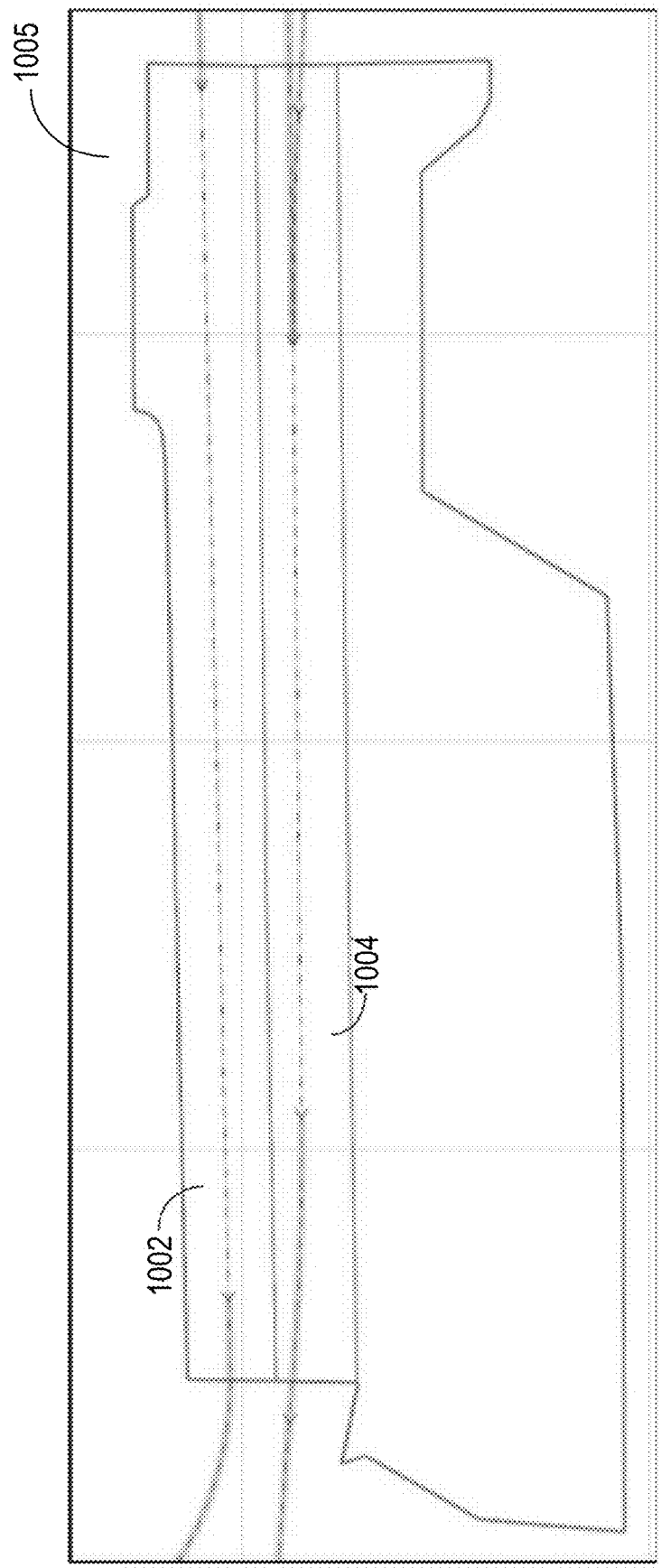
FIG. 10B shows a diagram of an example of a road segment containing two lanes.

FIG. 10B shows a diagram of an example of a road segment 1005 containing two lanes 1002 and 1004. A road segment is a portion of a physical drivable region in the environment. A road segment can include one or multiple lanes. The road segment 1005 can include multiple lanes traveling in the same directions. Lanes in the same road segment can be indexed in the lateral direction. A road segment is longitudinally connected to other road segments by road segment connectors. A road segment connector is associated with an intersection and can include one or many lane connectors.

Figure 11:
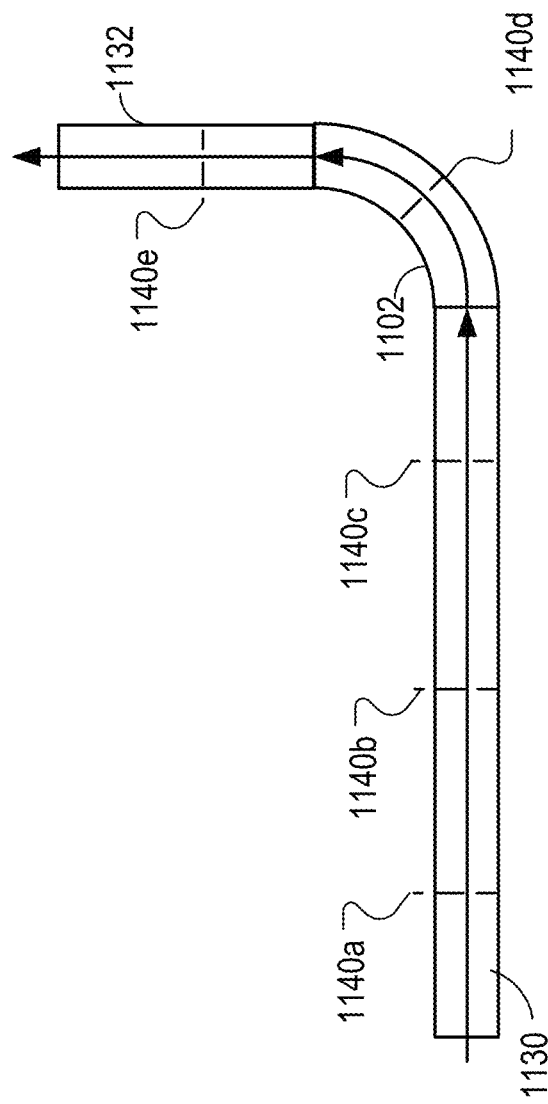
FIG. 11 shows a diagram of an example of a lane connector that connects two lanes and associated lateral widths.

FIG. 11 shows a diagram of an example of a lane connector 1102 that connects two lanes 1130, 1132 and associated lateral widths. The lane connector 1102 connects the end of the lane 1130 to the start of another lane 1132. The lane connector 1102 and lanes 1130, 1132 are associated with lateral widths 1140a-e. The lane connector 1102 and lanes 1130, 1132 can have one or more associated lateral width values. The lateral width values can provide the lateral extent of the side-to-side area that a vehicle can occupy when driving in the lane connector 1102 or lane 1130, 1132. In an embodiment, a lateral width value includes a left-side lateral width value and a right-side lateral width value that respectively provide lateral width information to the left and right of a central line.

Lateral widths, such as lateral widths 1140a-e, can be stored in a lookup table. The lookup can be used by a planning circuit for route planning. The lookup table can be generated based on information such as commercial databases, proprietary databases, geospatial map data, or other sources. In an embodiment, a lateral width lookup table can be generated on a server and provided to the AV via a network connection. There can be multiple lookup tables corresponding to different regions. Further, there can be multiple lookup tables within a region.

In an embodiment, a lookup table is indexed by distance. A lookup table can be computed for each lane or lane connector. In an embodiment, a lookup table can include separate tables, including a lane table and a lane connector table. In an embodiment, a lane table can include multiple entries. Each entry can include an identifier for a lane that corresponds to a distance from the start of the lane baseline (e.g., 0.0 meters) to the end of the lane baseline (e.g., the length of the baseline in meters) and a value associated with the identifier. In an embodiment, the value associated with the identifier can be a pair of real numbers specifying the width to the left and right side of the lane. In an embodiment, a lookup table can be implemented as an array of values that is accessed by an array index which corresponds to a lane identifier. A similar table can be created for lane connectors. In an embodiment, a single table includes entries for both lanes and lane connectors.

The resolution for the lookup can be configurable. In an embodiment, tables associated with different geographic areas can have different resolutions. Based on a 1.0 meter resolution, for example, the size of the lookup table can be the ceiling of the length of the path. Increasing the resolution to 0.5 meters, for example, would double the size of the lookup take because there would be twice as many entries compared to a table with 1.0 meter resolution.

A lookup table can be precomputed at each index along the baseline. When a client queries for the width to the left and right of a lane or lane connector, giving a position, that position can be projected onto the baseline to obtain the length along the baseline. As such, a query can include determining indices closest to the position, retrieving values associated with the indices from the table, and interpolating those values based on an interval progress value. For example, assume that the projected length is 3.3m along a baseline of length 7m. In this example, a query can include interpolating the pair of widths at the indices obtained by retrieving the ceiling and floor of 3.3m (4.0m and 3.0m in this case respectively) and the interval progress between the indices, in this case 0.3 ((projected_length/resolution)−floor (3.3)) to obtain an interpolated_pair_value=lookup[3]+0.3*(lookup[4]−lookup[3]). Other techniques for interpolation are possible.

Figure 12:
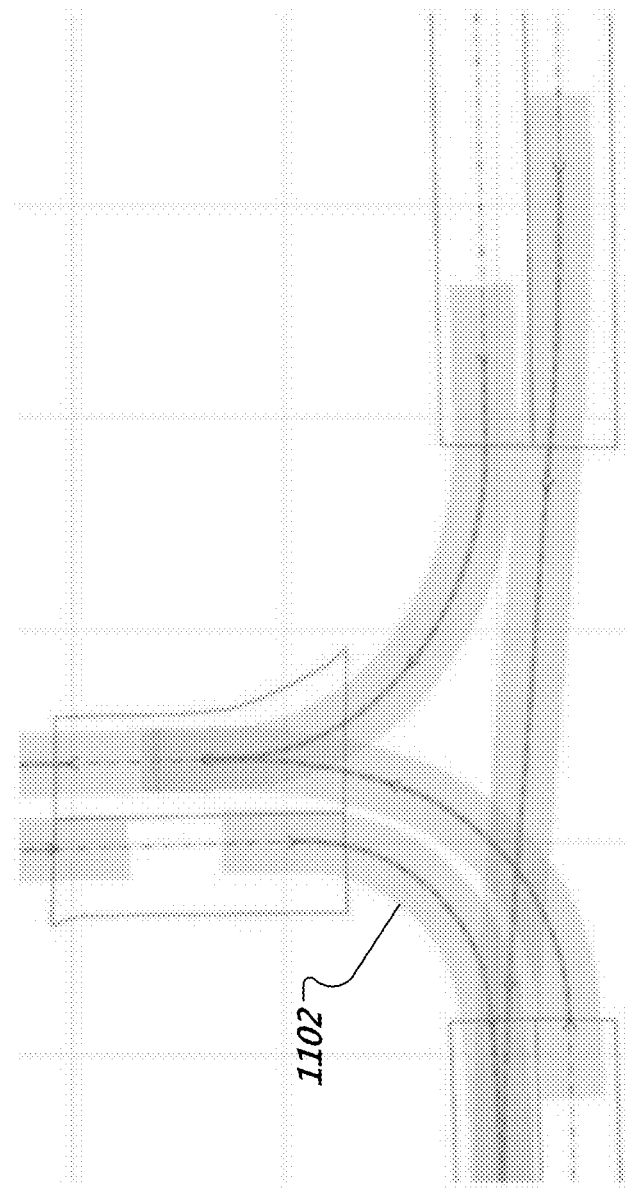
FIG. 12 shows a diagram of an example of the lane connector associated with an intersection.

FIG. 12 shows a diagram of an example of the lane connector 1102 associated with an intersection 1202. The lane connector 1102 can be associated with a polygon representing its geographical extent on a geographic map. The lane connector 1102 can be associated with a road segment connector and with a baseline sequence. In the lane connector 1102 shown in FIG. 11, the shaded regions represent lane connecting polygons, each including an associated baseline. In an embodiment, the intersection 1202 can be associated with a polygon representing its geographical extent on the map. The intersection 1202 can include one or more multiple road segments.

A map of a geographic region can include various map elements include lanes, lane connectors, road segments, and intersections among other things. In an embodiment, the planning circuit uses one or more or all of the map elements described above to construct multiple plans for the AV to traverse within a geographic region. The origin (e.g., a first location in space at a particular time, sometimes referred to as a spatiotemporal location) and destination (e.g., a second spatiotemporal location) of the AV lie within the geographic region. The planning circuit can access a map of the geographic region which can be stored, for example, in a database (see, e.g., 410 of FIG. 4) or received from a different computer-readable storage medium that stores the map. The map includes information identifying at least one lane on which vehicles can travel in the geographic region.

The planning circuit can generate, from the map, a graph representing a driving environment of the AV. The graph of the driving environment of the AV represents a smaller geographic area compared to the map of the geographic region. For example, the graph of the driving environment of the AV can include the present spatiotemporal location of the AV and surrounding areas. The planning circuit can be configured to generate the graph of the driving environment as the 100 travels from one geographic area to the next.

Figure 13:
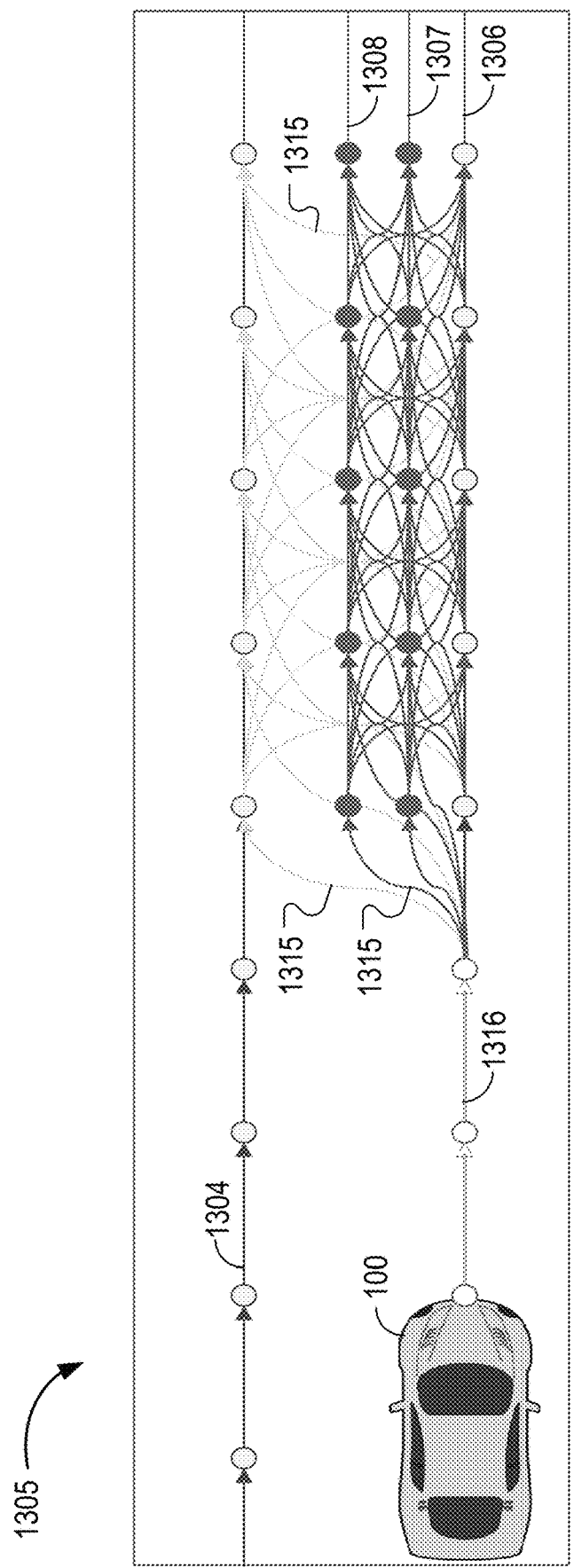
FIG. 13 shows a diagram of an example of a path graph.

FIG. 13 shows a diagram of an example of a path graph 1305. The path graph 1305 can be based on a map of a geographic region. The planning circuit of the AV 100 may consider one or multiple paths for determining how the vehicle may more. A list of possible paths can be generated. Constraints can be applied to the paths to select a path. The list of paths can be represented by a path graph 1305. The path graph 1305 can include a baseline path 1304 and one or more other paths 1306, 1307, 1308. In an embodiment, the baseline path 1304 represents a preferred or default path for a particular road segment. Lane connectors 1315 can be included in the path graph 1305 to create paths among different lanes in the path graph 1305. Lane connectors can in some cases serve as possible lane change paths. In front of the AV 100, there is a committed trajectory 1316 when in motion. The committed trajectory 1316 portion of the path 1306 will not be changed, e.g., re-planned, but everything after the portion can be subject to re-planning. The path graph 1305 can include parallel baselines 1307, 1308 that run with an offset from the baseline path 1304. The parallel baselines 1307, 1308 can provide a fine grain, e.g., smoother, transition from a starting path 1306 to the baseline path 1304.

Figure 14:
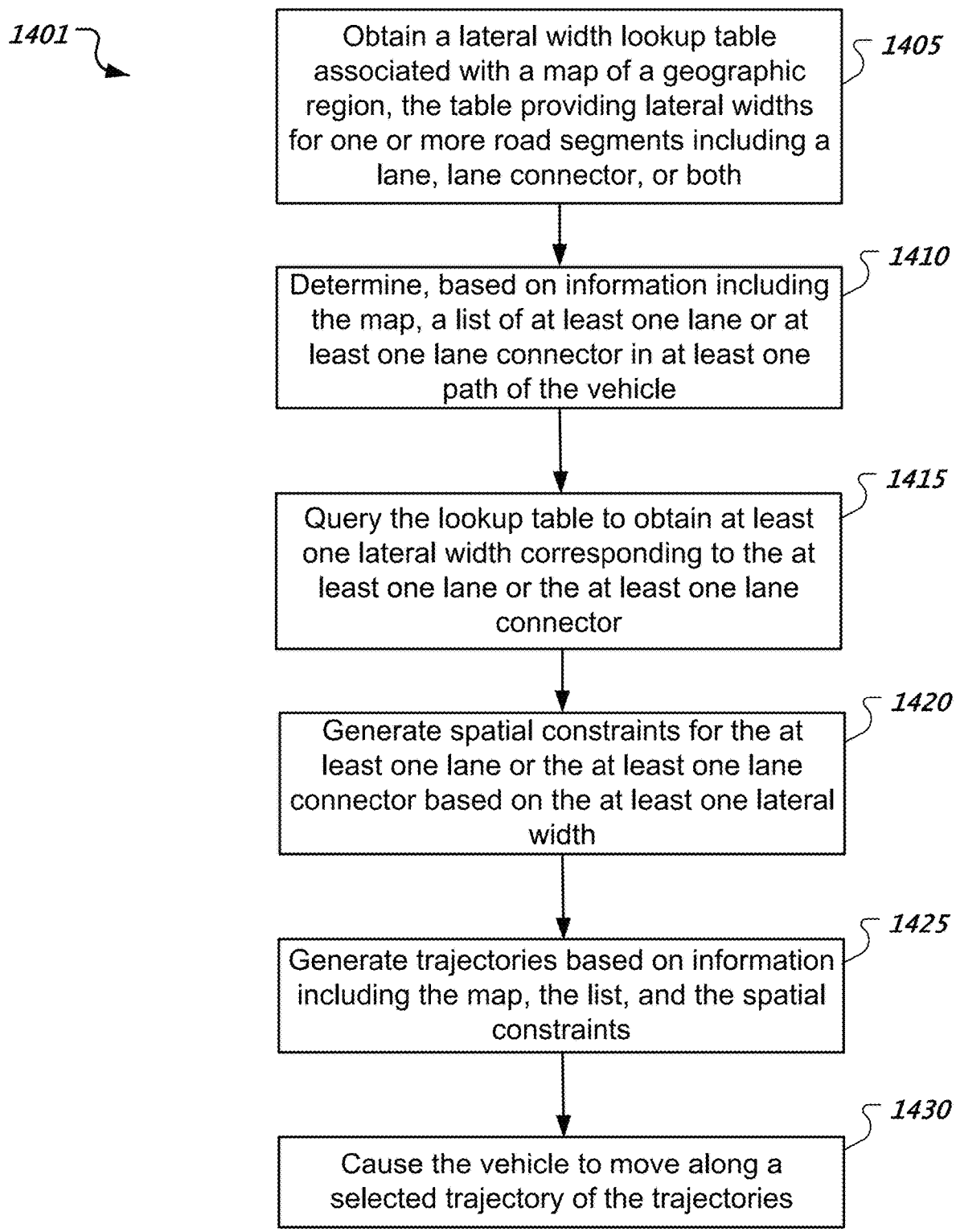
FIG. 14 shows a flowchart of an example of a process that performs planning and control of a vehicle using a lateral width lookup table.

The planning circuit can use spatial constraints for lanes and connectors to gauge how much lateral distance the AV has to work with when route planning. To create these constraints, queries on how far a lane or lane connector is from a transition in the path can be performed. For example, the planning circuit can obtain or compute a lateral width lookup table for lanes and lane connectors, compile a list of lanes and lane connectors in a given path, query the table for lane and lane connector widths over discretized transitions over the path, and use the widths to generate spatial constraints for lanes and connectors FIG. 14 shows a flowchart of an example of a process 1401 that performs planning and control of a vehicle using a lateral width lookup table. In this example, the process 1401 is performed by a planning circuit and a control circuit. At 1405, the planning circuit obtains a lateral width lookup table associated with a map of a geographic region, the table providing lateral widths for one or more road segments including a lane, lane connector, or both. The map can include information identifying lanes and lane connectors on which a vehicle can travel in the geographic region, the lookup table comprising lateral widths associated with the lanes and the lane connectors. In an embodiment, the lateral width lookup table is a data structure that stores various lateral widths for one or more road segments which include one or more lanes or lane connectors. In an embodiment, obtaining the lateral width lookup table includes retrieving information representing the lateral width lookup table over a network connection.

At 1410, the planning circuit determines, based on information including the map, a list of at least one lane or at least one lane connector in at least one path of the vehicle. In an embodiment, the list of the at least one lane or the at least one lane connector includes two or more potential lane connectors. The two or more potential lane connectors can be associated with a traffic intersection in the geographic region.

At 1415, the planning circuit queries the lookup table to obtain at least one lateral width corresponding to the at least one lane or the at least one lane connector. In an embodiment, querying the lookup table can include obtaining lateral widths for two or more potential lane connectors. For example, querying the lookup table can include querying the incoming lane connector, the lane, and outgoing lane connector. In an embodiment, querying the lookup table at 1415 includes obtaining at least two lateral widths associated with the at least one lane or the at least one lane connector, and performing an interpolation based on the at least two lateral widths to produce an interpolated lateral width. In an embodiment, the process 1401 includes determining transition points over the at least one path of the vehicle and querying the lookup table at 1415 includes using the transition points to obtain lateral widths. In an embodiment, the queried width can include a first value corresponding to a lateral width on a left-side of a lane or lane connector and a second value corresponding to a lateral width on a right-side of a lane or lane connector.

At 1420, the planning circuit generates spatial constraints for the at least one lane or the at least one lane connector based on the at least one lateral width. The AV can occupy any area within the boundaries defined by the spatial constraints. At 1425, the planning circuit generates trajectories based on information including the map, the list, and the spatial constraints. In an embodiment, each trajectory is a path for the vehicle to autonomously move from a first spatiotemporal location on the map to a second spatiotemporal location on the map, where the trajectory can include one or more lane or lane connects along which the vehicle can move. At 1430, the control circuit causes the vehicle to move along a selected trajectory of the trajectories. If multiple trajectories are generated, a trajectory can be selected based on one or more factors such as safety, passenger comfort, etc.

Figure 15A:
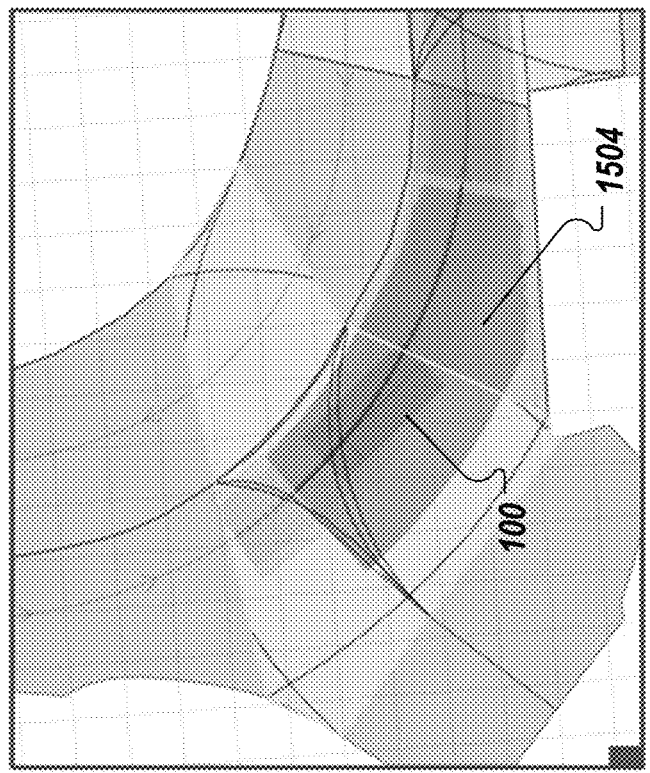
FIGS. 15A and 15B show different polygons representing examples of constraints for a vehicle.
Figure 15B:
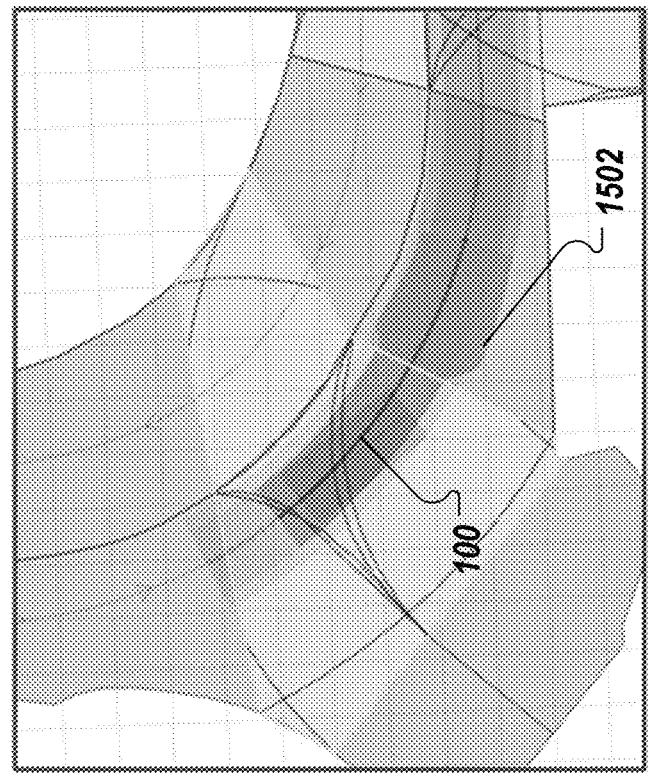

FIGS. 15A and 15B show different polygons 1502, 1504 representing examples of constraints for a vehicle 100. FIG. 15A shows a polygon 1502 that is based on a static lateral width value. FIG. 15B shows a polygon 1504 that is based on retrieving one or more lateral width values from a table. In this example, the retrieved lateral width values provide more area for the vehicle 100 to maneuver than the static lateral width value and hence the polygon 1504 of FIG. 15B is larger compared to the smaller polygon 1502 of FIG. 15A.

Figure 16B:
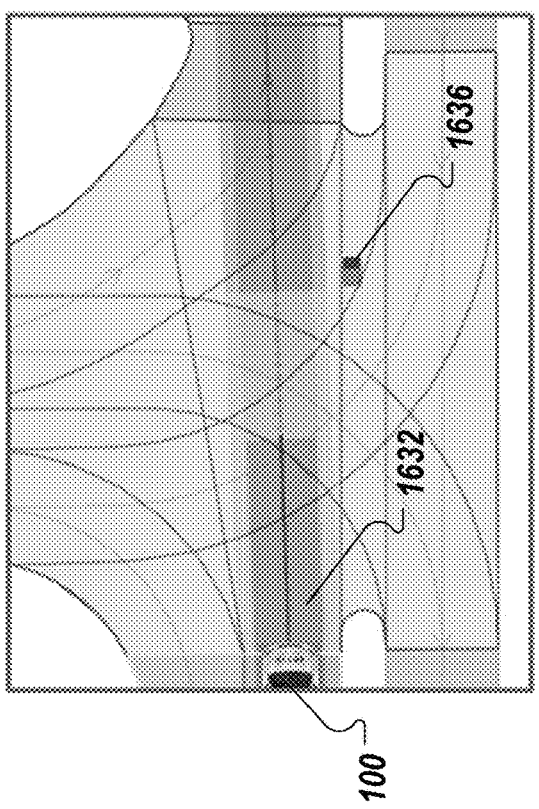
FIGS. 16A and 16B show different polygons representing examples of constraints for a vehicle when handling an obstacle such as a pedestrian.
Figure 16A:
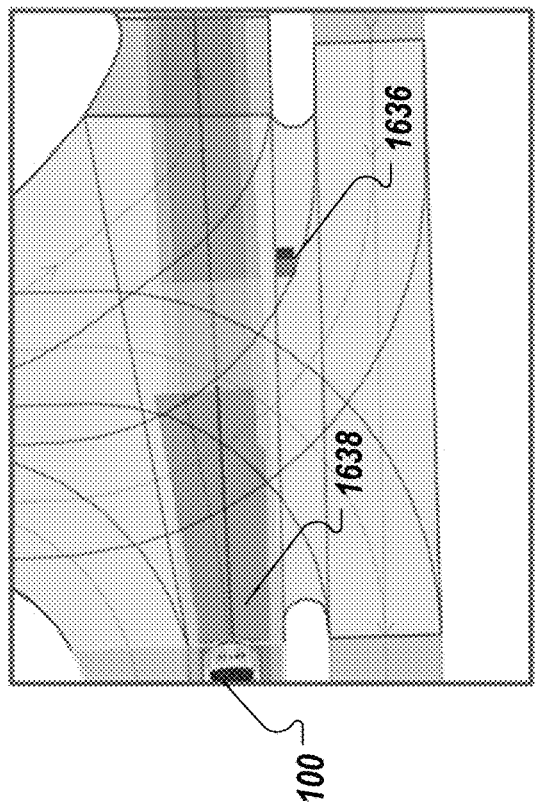

FIGS. 16A and 16B show different polygons 1502, 1504 representing examples of constraints for a vehicle 100 when handling an obstacle 1636 such as a pedestrian. FIG. 16A shows a polygon 1602 corresponding to spatial constraints imposed in part by a static lateral width value. FIG. 16B shows a polygon 1604 corresponding to spatial constraints imposed in part by a dynamic lateral width value(s), e.g., which is retrieved from a lateral width lookup table. In this example, the retrieved lateral width value(s) provides more area for the vehicle 100 to maneuver to avoid the obstacle 1636 than the static lateral width value and hence the polygon 1638 of FIG. 15B is larger compared to the smaller polygon 1502 of FIG. 15A. In this example, the larger area can translate into more options for avoiding the obstacle 1636 while continuing to drive such as moving away from the obstacle 1636, but still satisfying the spatial constraints.

In an embodiment, a vehicle can include a memory including a lateral width lookup table associated with a map of a geographic region, the map comprising information identifying lanes and lane connectors on which the vehicle can travel in the geographic region, the lookup table comprising lateral widths associated with the lanes and the lane connectors; a planning circuit communicatively coupled with the memory; and a control circuit communicatively coupled with the planning circuit. The planning circuit can be configured to perform operations that include determining a list of at least one lane or at least one lane connector in at least one path of the vehicle, querying the lookup table to obtain at least one lateral width corresponding to the at least one lane or the at least one lane connector, generating spatial constraints for the at least one lane or the at least one lane connector based on the at least one lateral width, and generating trajectories based on the list and the spatial constraints. The control circuit can be configured to cause the vehicle to move along a selected trajectory of the trajectories.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    obtaining, by a planning circuit of a vehicle, a lateral width lookup table associated with a map of a geographic region, the map comprising information identifying lanes and lane connectors on which a vehicle can travel in the geographic region, the lookup table comprising lateral widths corresponding to respective ones of the lanes and lateral widths corresponding to respective ones of the lane connectors;
    determining, by the planning circuit and from the map, a list of at least one lane or at least one lane connector in at least one path of the vehicle;
    querying, by the planning circuit, the lookup table to obtain at least one lateral width corresponding to the at least one lane or the at least one lane connector;
    generating, by the planning circuit, spatial constraints for the at least one lane or the at least one lane connector based on the at least one lateral width, wherein generating the spatial constraints comprises using the at least one lateral width to determine a lateral distance that is available to the vehicle for maneuvering away from an obstacle on a path of the vehicle while continuing on to a destination;
    generating, by the planning circuit and from the map, trajectories based on the list and the spatial constraints; and
    causing, by a control circuit of the vehicle, the vehicle to move along a selected trajectory of the trajectories.

2. The method of claim 1, wherein the list of the at least one lane or the at least one lane connector comprises two or more potential lane connectors, and wherein querying the lookup table comprises obtaining lateral widths for the two or more potential lane connectors, respectively.

3. The method of claim 2, wherein the two or more potential lane connectors are associated with a traffic intersection in the geographic region.

4. The method of claim 1, wherein querying the lookup table comprises obtaining at least two lateral widths associated with the at least one lane or the at least one lane connector, and performing an interpolation based on the at least two lateral widths to produce an interpolated lateral width.

5. The method of claim 1, comprising:
    determining transition points over the at least one path of the vehicle,
    wherein querying the lookup table comprises using the transition points to obtain lateral widths.

6. The method of claim 1, wherein obtaining the lateral width lookup table comprises retrieving information representing the lateral width lookup table over a network connection.

7. The method of claim 1, wherein the at least one lateral width corresponding to the at least one lane or the at least one lane connector comprises i) a first value corresponding to a lateral width on a left-side of a lane or lane connector and ii) a second value corresponding to a lateral width on a right-side of a lane or lane connector.

8. A vehicle comprising:
    a memory comprising a lateral width lookup table associated with a map of a geographic region, the map comprising information identifying lanes and lane connectors on which the vehicle can travel in the geographic region, the lookup table comprising lateral widths corresponding to respective ones of the lanes and lateral widths corresponding to respective ones of the lane connectors;
    a planning circuit communicatively coupled with the memory; and
    a control circuit communicatively coupled with the planning circuit,
    wherein the planning circuit is configured to perform operations comprising:
        determining a list of at least one lane or at least one lane connector in at least one path of the vehicle,
        querying the lookup table to obtain at least one lateral width corresponding to the at least one lane or the at least one lane connector,
        generating spatial constraints for the at least one lane or the at least one lane connector based on the at least one lateral width, and
        generating trajectories based on the list and the spatial constraints, wherein the planning circuit is configured to use the at least one lateral width to determine a lateral distance that is available to the vehicle for maneuvering away from an obstacle on a path of the vehicle while continuing on to a destination, and wherein the control circuit is configured to cause the vehicle to move along a selected trajectory of the trajectories.

9. The vehicle of claim 8, wherein the list of the at least one lane or the at least one lane connector comprises two or more potential lane connectors, and wherein querying the lookup table comprises obtaining lateral widths for the two or more potential lane connectors, respectively.

10. The vehicle of claim 9, wherein the two or more potential lane connectors are associated with a traffic intersection in the geographic region.

11. The vehicle of claim 8, wherein querying the lookup table comprises obtaining at least two lateral widths associated with the at least one lane or the at least one lane connector, and performing an interpolation based on the at least two lateral widths to produce an interpolated lateral width.

12. The vehicle of claim 8, wherein the operations comprise determining transition points over the at least one path of the vehicle, and wherein querying the lookup table comprises using the transition points to obtain lateral widths.

13. The vehicle of claim 8, wherein obtaining the lateral width lookup table comprises retrieving information representing the lateral width lookup table over a network connection.

14. The vehicle of claim 8, wherein the at least one lateral width corresponding to the at least one lane or the at least one lane connector comprises i) a first value corresponding to a lateral width on a left-side of a lane or lane connector and ii) a second value corresponding to a lateral width on a right-side of a lane or lane connector.

15. A non-transitory computer-readable storage medium comprising at least one program for execution by at least one processor of a device, the at least one program including instructions which, when executed by the at least one processor, cause the device to perform operations comprising:

obtaining a lateral width lookup table associated with a map of a geographic region, the map comprising information identifying lanes and lane connectors on which a vehicle can travel in the geographic region, the lookup table comprising lateral widths corresponding to respective ones of the lanes and lateral widths corresponding to respective ones of the lane connectors;

determining a list of at least one lane or at least one lane connector in at least one path of the vehicle;

querying the lookup table to obtain at least one lateral width corresponding to the at least one lane or the at least one lane connector;

generating spatial constraints for the at least one lane or the at least one lane connector based on the at least one lateral width, wherein generating the spatial constraints comprises using the at least one lateral width to determine a lateral distance that is available to the vehicle for maneuvering away from an obstacle on a path of the vehicle while continuing on to a destination;

generating trajectories based on the list and the spatial constraints; and causing the vehicle to move along a selected trajectory of the trajectories.

16. The computer-readable storage medium of claim 15, wherein the list of the at least one lane or the at least one lane connector comprises two or more potential lane connectors, and wherein querying the lookup table comprises obtaining lateral widths for the two or more potential lane connectors, respectively.

17. The computer-readable storage medium of claim 16, wherein the two or more potential lane connectors are associated with a traffic intersection in the geographic region.

18. The computer-readable storage medium of claim 15, wherein querying the lookup table comprises obtaining at least two lateral widths associated with the at least one lane or the at least one lane connector, and performing an interpolation based on the at least two lateral widths to produce an interpolated lateral width.

19. The computer-readable storage medium of claim 15, wherein the operations comprise determining transition points over the at least one path of the vehicle, wherein querying the lookup table comprises using the transition points to obtain lateral widths.

20. The computer-readable storage medium of claim 15, wherein obtaining the lateral width lookup table comprises retrieving information representing the lateral width lookup table over a network connection.

* * * * *